United States Patent
Cummings (10) Patent No.: US 11,183,891 B2
(45) Date of Patent: Nov. 23, 2021

(54) MAGNET DRIVEN MOTOR AND METHODS RELATING TO SAME

(71) Applicant: Michael Cummings, Nashville, TN (US)

(72) Inventor: Michael Cummings, Nashville, TN (US)

(73) Assignee: Michael Cummings, Nashville, TN (US)

( * ) Notice: Subject to any disclaimer, the term of this patent is extended or adjusted under 35 U.S.C. 154(b) by 229 days.

(21) Appl. No.: 16/446,410

(22) Filed: Jun. 19, 2019

(65) Prior Publication Data
US 2020/0403465 A1    Dec. 24, 2020

(51) Int. Cl.
| | |
|---|---|
| H02K 1/27 | (2006.01) |
| H02K 7/00 | (2006.01) |
| H02K 7/116 | (2006.01) |
| H02K 7/18 | (2006.01) |
| H02K 7/02 | (2006.01) |

(52) U.S. Cl.
CPC .............. *H02K 1/27* (2013.01); *H02K 7/003* (2013.01); *H02K 7/02* (2013.01); *H02K 7/116* (2013.01); *H02K 7/1823* (2013.01)

(58) Field of Classification Search
CPC ........ H02K 7/1823; H02K 1/27; H02K 7/003; H02K 53/00; H02K 7/02; H02K 7/116
See application file for complete search history.

(56) References Cited

U.S. PATENT DOCUMENTS

| | | | |
|---|---|---|---|
| 2,994,984 A | 8/1961 | Luchsinger | |
| 3,992,132 A | 11/1976 | Putt | |
| 4,488,075 A | 12/1984 | DeCesare | |
| 5,034,881 A | 7/1991 | Hoashi et al. | |

(Continued)

FOREIGN PATENT DOCUMENTS

| | | |
|---|---|---|
| CN | 107222042 A | 9/2017 |
| DE | 202018003085 U1 | 9/2018 |

(Continued)

OTHER PUBLICATIONS

Screen captures from Youtube video clip entitled "Magnet Motor South Korea | ancient technology revealed", 6 pages, uploaded on Dec. 5, 2017, by user "B'c C.m". Retrieved from Internet: <https://www.youtube.com/watch?v=Liz_oNaY0l0>.

(Continued)

*Primary Examiner* — Naishadh N Desai
(74) *Attorney, Agent, or Firm* — Fitch, Even, Tabin & Flannery LLP (57) ABSTRACT

A motor comprising a main shaft, a first rotating member mounted on the main shaft, the first rotating member comprising a first arm extending radially outward from the main shaft, the first arm having a length L, a second arm extending radially outward from the main shaft, a first magnet mounted on the first arm such that a first pole faces a recess between the first and second arms, and a second magnet mounted on the second arm such that the first pole faces the recess between the first and second arms. The motor further comprising a piston movable towards and away from the main shaft in a generally radial direction and positioned proximate the first rotating member, the piston comprising a first magnet.

21 Claims, 8 Drawing Sheets

(56) References Cited

U.S. PATENT DOCUMENTS

| | | | |
|---|---|---|---|
| 5,135,425 | A | 8/1992 | Andrews et al. |
| 5,237,232 | A | 8/1993 | Kitamura |
| 6,140,730 | A | 10/2000 | Tkaczyk et al. |
| 6,814,679 | B1 | 11/2004 | Chen |
| 7,095,126 | B2 | 8/2006 | McQueen |
| 7,151,332 | B2 | 12/2006 | Kundel |
| 8,847,452 | B1 | 9/2014 | Belanger |
| 9,413,214 | B2 * | 8/2016 | Giummo ............... H02K 21/00 |
| 9,509,186 | B2 | 11/2016 | Biffard et al. |
| 2006/0046878 | A1 | 3/2006 | Yang |
| 2007/0145846 | A1 | 6/2007 | Vila |
| 2007/0210659 | A1 * | 9/2007 | Long ..................... H02K 49/10 310/80 |
| 2008/0011113 | A1 * | 1/2008 | Safran ..................... H02K 7/06 74/89.17 |
| 2008/0164778 | A1 * | 7/2008 | Schieffer ............... H02K 7/083 310/152 |
| 2010/0181856 | A1 | 7/2010 | Chen |
| 2011/0198958 | A1 | 8/2011 | Kozeka |
| 2015/0033938 | A1 * | 2/2015 | Erlston ................ F03C 1/0403 91/55 |
| 2017/0077781 | A1 * | 3/2017 | Sadler .................... H02K 53/00 |
| 2018/0342930 | A1 | 11/2018 | Roberts |
| 2020/0403465 | A1 | 12/2020 | Cummings |

FOREIGN PATENT DOCUMENTS

| | | |
|---|---|---|
| GB | 002127232 A | 4/1984 |
| JP | 52038107 A | 3/1977 |
| JP | 60213239 A | 10/1985 |
| WO | 2007079610 A1 | 7/2007 |
| WO | 2008023189 A1 | 2/2008 |
| WO | 2017168937 A1 | 10/2017 |

OTHER PUBLICATIONS

Notification of Transmittal of the International Search Report and Written Opinion of the International Searching Authority, or the Declaration of the International Bureau of WIPO for corresponding International Application No. PCT/US20/28185, dated Jul. 20, 2020, 15 pages.

Office Action issued in related U.S. Appl. No. 16/446,446, dated Jan. 5, 2021, 14 pages.

Davis, Sam et al., "New Discovery Could Lead to Commercial Production of Permanent Magnet Motors," Power Electronics, published electronically Nov. 14, 2017, 15 pages.

Davis, Sam, "Is a Permanent Magnet Motor Feasible?" Power Electronics, published electronically Nov. 18, 2017, 4 pages.

Neil, Dan, "One Man's Unlikely Quest to Power the World with Magnets," The Wall Street Journal, electronically published May 16, 2019, 13 pages.

* cited by examiner

MAGNET DRIVEN MOTOR AND METHODS RELATING TO SAME

TECHNICAL FIELD

This invention relates generally to motors, and more specifically relates to motors driven by magnets and methods relating to same.

BACKGROUND

Magnets generate magnetic fields. These magnetic fields act upon other magnets and cause them to move. The moving magnets can be coupled to a shaft so that the kinetic energy of the moving magnets can be used to drive a device, such as a generator. Magnet driven motors may use permanent magnets, electromagnets, or combinations thereof.

Two general designs of permanent magnet motors have previously been proposed. The first design has two disks or wheels having a plurality of permanent magnets mounted to and spaced along half its circumference. The permanent magnets are oriented such that the axis of the magnets is oblique to a tangent line of the circumference of the wheel at the position of each magnet. An electromagnet is in a fixed position around the outside of each wheel such that the opposed magnetic fields of the fixed magnets and the wheel mounted magnets cause the wheel to spin. One illustrative example of this design is found in U.S. Pat. No. 5,594,289 to Minoto.

Another design involves moving a first magnet along a portion of a square or rectangular path in which it moves directly towards or away from a second, stationary magnet along the direction of their poles. When the magnets are sufficiently close together, the movable magnet moves away from the stationary magnet at a 90-degree angle. One example of this design is found in U.S. Publication No. 2011/0198958.

The first design described in the Minato patent requires electrical energy to power the electromagnets. The second of these styles of permanent magnet motor described above has not been shown to produce a practical motor. In addition, they do not output a consistent level of energy as the magnets are moved along their paths relative to each other.

Therefore, a need exists for an improved magnet motor.

SUMMARY OF THE INVENTION

A motor is provided driven by magnets. The motor includes a main shaft. A plurality of rotating members are mounted on the main shaft and fixed to the main shaft such that rotation of the rotating members causes the main shaft to rotate. In one form, the motor uses only permanent magnets. Alternatively, the magnet motor may also employ one or more electromagnets.

In one embodiment each rotating member has a plurality of arms extending radially outward from the center. The arms have a length L from the axis of the rotating member to the tip of the arm. Adjacent arms define a recess or cavity there between. Each arm includes one or more magnets. The magnets on each arm are oriented with their poles pointing substantially perpendicular to the longitudinal direction of the arm.

The motor further includes at least one piston positioned proximate each rotating member. The piston includes at least one magnet mounted proximate the rotating member. The at least one magnet is oriented such that magnetic lines of force emanating from each pole of the magnet are substantially perpendicular to the direction of movement of the piston and parallel to the poles of the magnets on the arms of the rotating member.

The piston is movable relative to the rotating member in a generally radial direction. In operation, the piston moves between a first position and a second position towards and away from the main shaft in a reciprocating motion as the rotating member rotates. The piston is movable from the first position, in which the at least one magnet is at least L distance away from the main shaft, to the second position in which the magnet is less than L distance away from the main shaft.

In operation, the piston moves towards and away from the main shaft synchronously with the rotating member as the rotating member rotates. When none of the arms are at an angular position aligned with the direction of travel of the piston, the piston is positioned inward towards the main shaft such that the magnet on the piston is positioned in the recess between two adjacent arms. As the rotating member continues to rotate, the piston moves outward from the main shaft thereby providing clearance for the approaching arm such that the rotating member can continue to rotate.

In some embodiments of the present invention a second magnet is mounted on the piston on the opposite side of the main shaft that operates in substantially the same manner. The second magnet on the piston on the opposite side of the main shaft is less than distance L away from the main shaft when the piston is in the first position and at least a distance L away when the piston is in the second position. That is, when the first piston magnet is positioned at its maximum distance away from the main shaft, the second piston magnet is positioned at its minimum distance away from the main shaft, and vice-versa.

In one embodiment, each of the plurality of rotating members is substantially the same. The arms of the plurality of rotating members are offset from each other such that when an arm of a first rotating member is aligned with the direction of travel of the piston, every arm of the other rotating member(s) is at an angular position such that each arm is offset from the axis of the direction of travel of a corresponding piston.

Elements in the figures are illustrated schematically for simplicity and clarity and have not necessarily been drawn to scale or to include all features, options or attachments. For example, the dimensions and/or relative positioning of some of the elements in the figures may be exaggerated relative to other elements to improve understanding of various embodiments of the present invention. Also, common, well-understood elements that are useful or necessary in a commercially feasible embodiment are often not depicted in order to facilitate a less obstructed view of various embodiments of the present invention. Certain actions and/or steps may be described or depicted in a particular order of occurrence while those skilled in the art will understand that such specificity with respect to sequence is not actually required. The terms and expressions used herein have the ordinary technical meaning accorded to such terms and expressions by persons skilled in the technical field as set forth above except where different specific meanings have otherwise been expressly set forth herein.

DETAILED DESCRIPTION

Figure 1A:
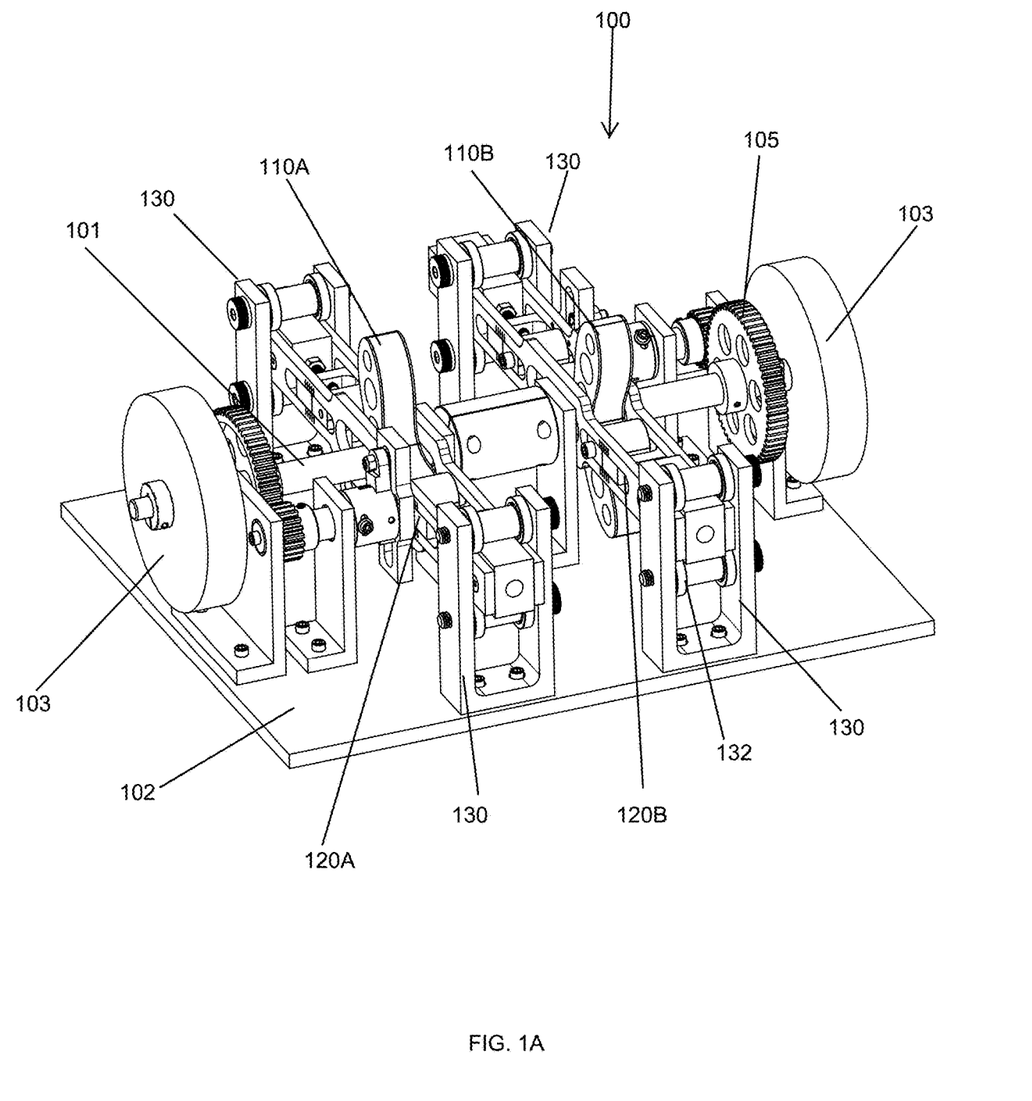
FIG. 1A is a perspective view of a magnet motor in accordance with embodiments of the present invention.
Figure 1B:
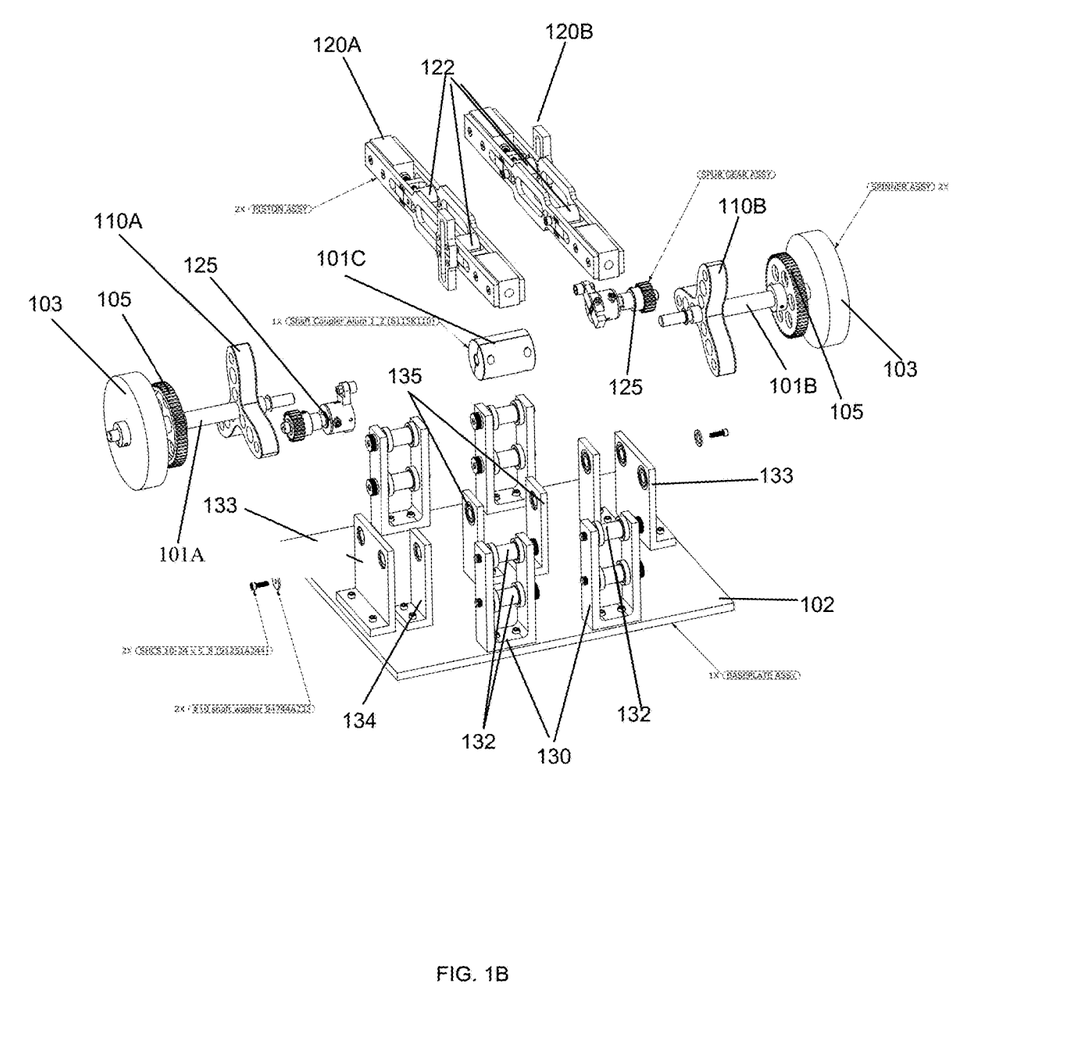
FIG. 1B is an exploded view of the magnet motor of FIG. 1A.

FIGS. 1A-1B illustrate a magnet motor 100. The magnet motor 100 includes a plurality of rotating members 110A, 110B mounted on a main shaft 101. Although the embodiment illustrated in the figures has two rotating member 101A and 101B, it should be understood that the motor of the present invention may include more than two rotating members. In operation, rotation of the rotating members 110A, 110B causes the main shaft 101 to rotate. The main shaft 101 is operably coupled to a pair of gears 105 and a pair of flywheels 103, which are rotated by rotation of the main shaft 101.

In one embodiment, the motor 100 further includes pistons 120A, 120B corresponding to each rotating member 110A, 110B, respectively. The pistons 120A, 120B are movable in a generally radial direction towards and away from the rotating members. The pistons 120A, 120B are driven by spur gears 125. The spur gears 125 are operably coupled to the gears 105 such that rotation of the main shaft 101 causes spur gears 125 to rotate, which as explained further below causes the pistons 120A, 120B to move towards and away from the main shaft 101 in a generally radial direction. In one embodiment, each piston 120A, 120B has a pair of magnets 122 positioned proximate the rotating member on opposite sides of the main shaft 101.

Figure 2:
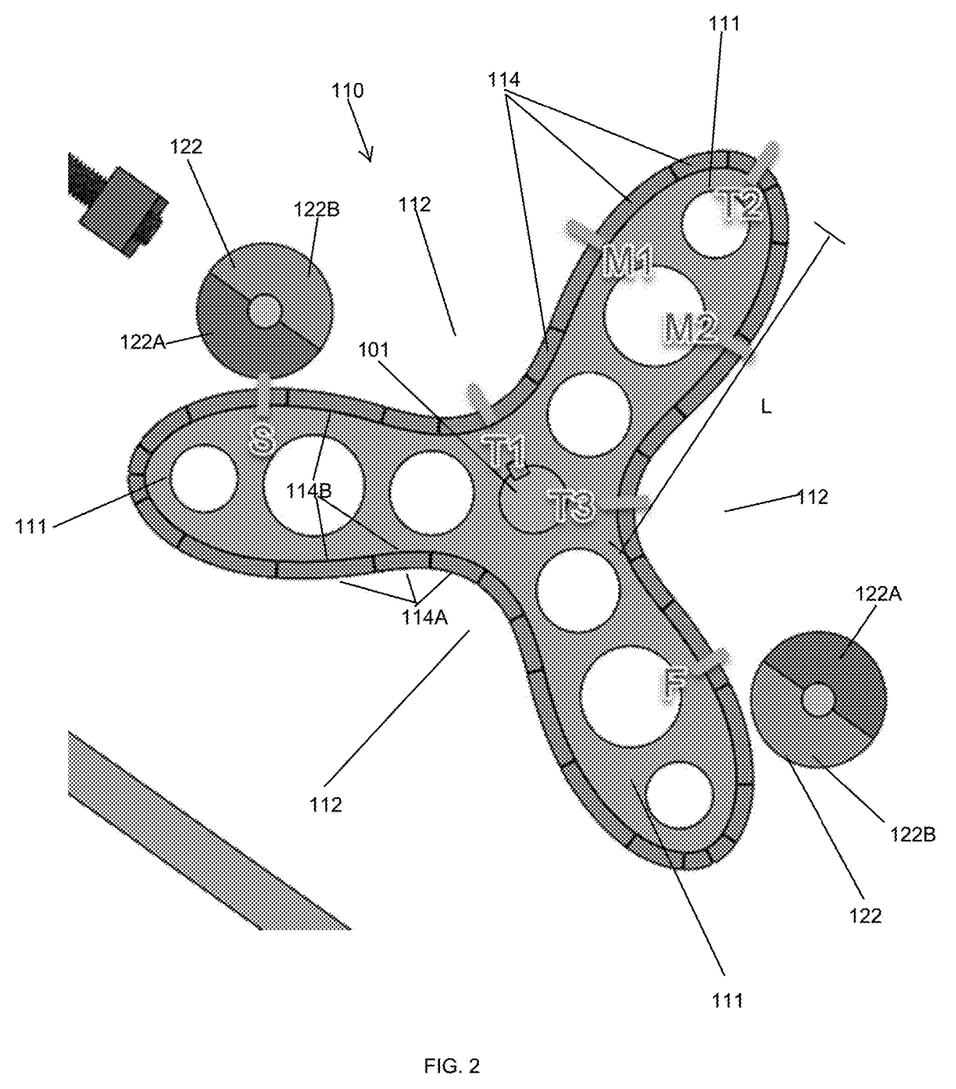
FIG. 2 is a schematic, front elevational view of a rotating member and piston mounted magnets of the magnet motor of FIGS. 1A-1B.
Figure 3:
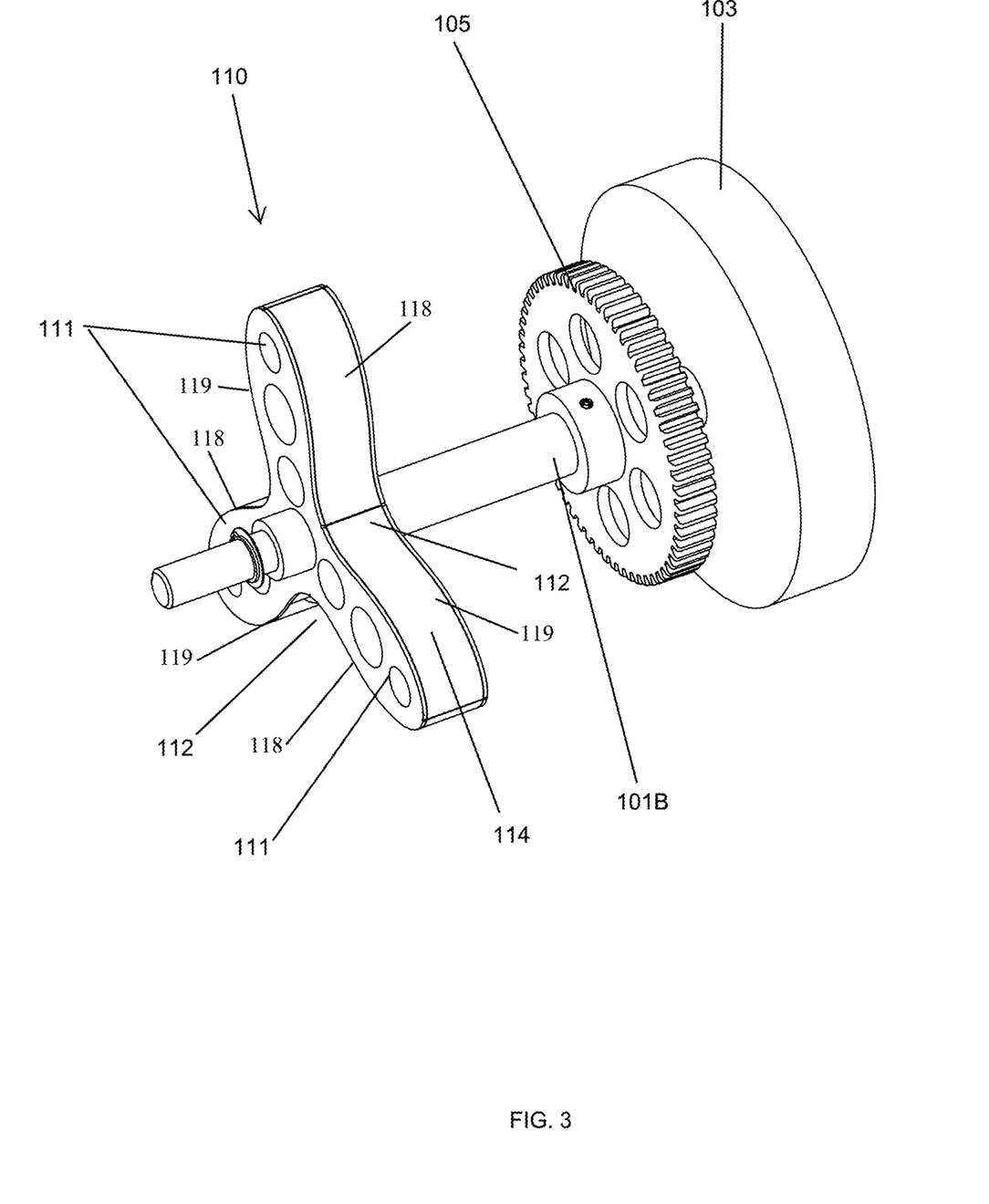
FIG. 3 is a perspective view of a rotating member and main shaft assembly of the magnet motor of FIGS. 1A-1B.

Turning to FIGS. 2-3, each rotating member 110 has three or more arms 111 spaced at an equal angular distance apart from each other. In the shown embodiment, the rotating member has three arms 111, each spaced 120 degrees from the other two arms, but it is understood that more than three arms can be used. Adjacent arms 111 define a recess or cavity 112 therebetween. The arms 111 are at least partially covered on the surface parallel to the axis of the main shaft 101 with magnets 114 mounted thereto. The magnets 114 extend along each arm with their poles pointing substantially perpendicular to the main shaft 101 and toward the recesses 112. In one embodiment each magnet 114 is oriented such that a first pole 114A points outward from the rotating member 110 and a second pole 114B points inward toward the rotating member 110.

Each arm 111 has a first side 118 and a second side 119. Each recess 112 is faced by the first side 118 of a first arm 111 and the second side 119 of a second arm 111.

In one embodiment, the arms 111 are formed of a ferromagnetic material, such as iron or steel. As such, the arms 111 act as a magnetic shield, shielding the inward facing pole of the magnets 114.

The magnets 122 on the pistons 120 are oriented such that the poles are pointing perpendicular to the longitudinal axis of the main shaft 101. When an arm 111 is pointed directly at a magnet 122, the poles of the magnet 122 are also perpendicular to the longitudinal axis of the arm 111. Accordingly, when a magnet 122 is positioned within a recess 112, the first pole 122A faces a first arm 111 and the second pole 122B faces a second arm. The first arm 111 is repelled by the magnet 122 and the second arm 111 is attracted to the magnet 122, which causes the rotating member to rotate. As shown, the poles of the two magnets 122 are reversed relative to each other such that they both cause the rotating member 110 to rotate in the same direction (counterclockwise from the point of view of FIG. 2).

Returning to FIGS. 1A-1B, each piston 120A, 120B is movably mounted on a pair of supports 130. Each support 130 has rollers or bearings 132 along which the piston 120A/120B rides. With each full rotation of the spur gear 125 the piston 120A/120B makes a full path such that one magnet 122 goes from its furthest point from the main shaft 101 (a distance greater than L), to its closest point to the main shaft 101 (a distance less than L), and back to its furthest point. As shown, the circumference of the spur gear 125 is smaller than the circumference of the gear 105 by a ratio corresponding to the number of arms 111 of the rotating member. Thus, in the shown embodiment, the spur gear has a circumference equal to ⅓ the circumference of the gear 105. Accordingly, for each complete rotation of the main shaft 101 and the gear 105, each of the magnets 122 travels the full path into and out of each cavity 112 of the rotating member 110, i.e., a full path towards and away from the main shaft 101, three times.

The supports 130 are mounted to a base plate 102. The motor further includes supports 133, 134, and 135 for supporting the main shaft ends, spur gears, and main shaft center respectively. Each support 133, 134, 135 is also mounted to the base plate 102.

In some embodiments, the main shaft 101 is formed of a plurality of shaft portions 101A, 101B coupled together by a coupler 101C. The coupler 101C rigidly attaches the two shaft portions 101A, 101B such that they operate as a single shaft 101.

Figure 4:
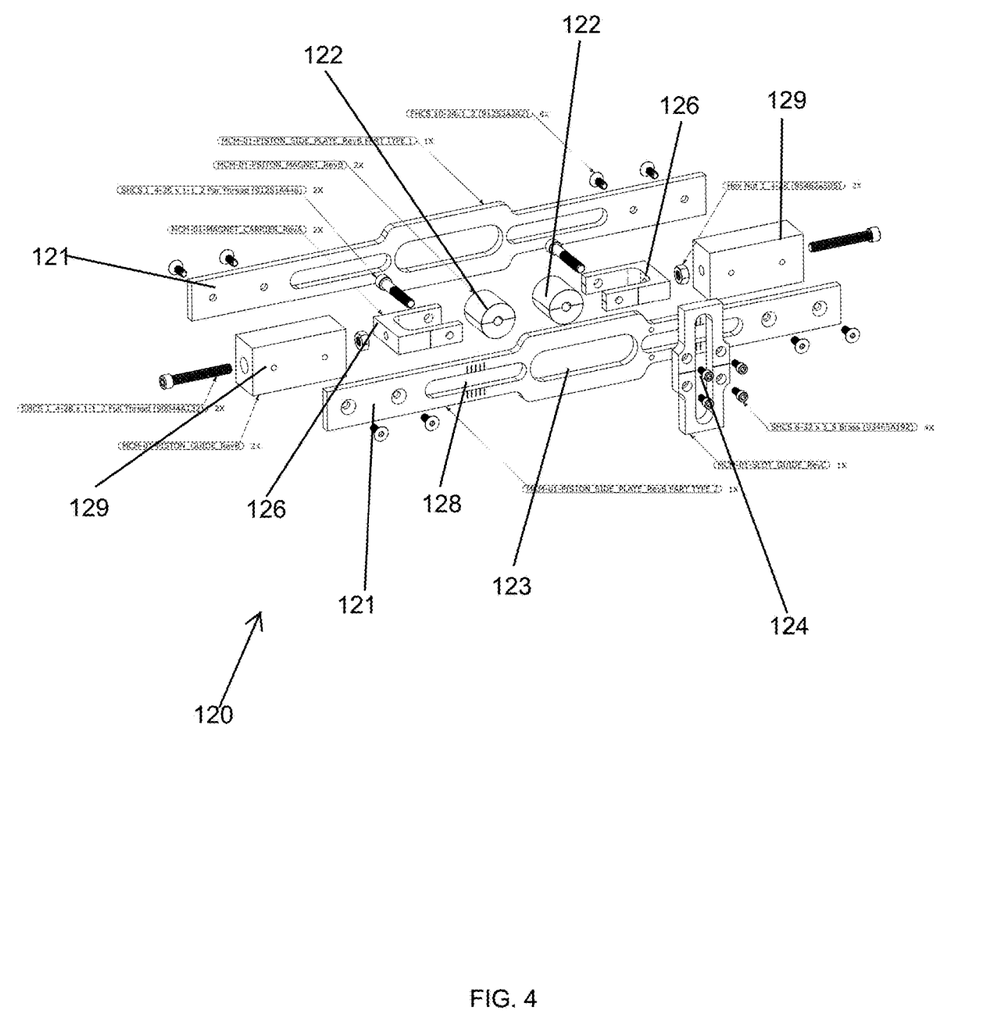
FIG. 4 is an exploded view of a piston assembly of the magnet motor of FIGS. 1A-1B.

A piston 120 is shown in greater detail in FIG. 4. The piston includes a pair of side members 121. The side members 121 are coupled to glides 129. The glides 129 are sized to ride on the bearings 132 discussed above. The magnets 122 are mounted to the side members 121 by holders 126. In some embodiments, the position of each magnet 122 is adjustable within slots 128 along the length of the piston 120.

Figure 5:
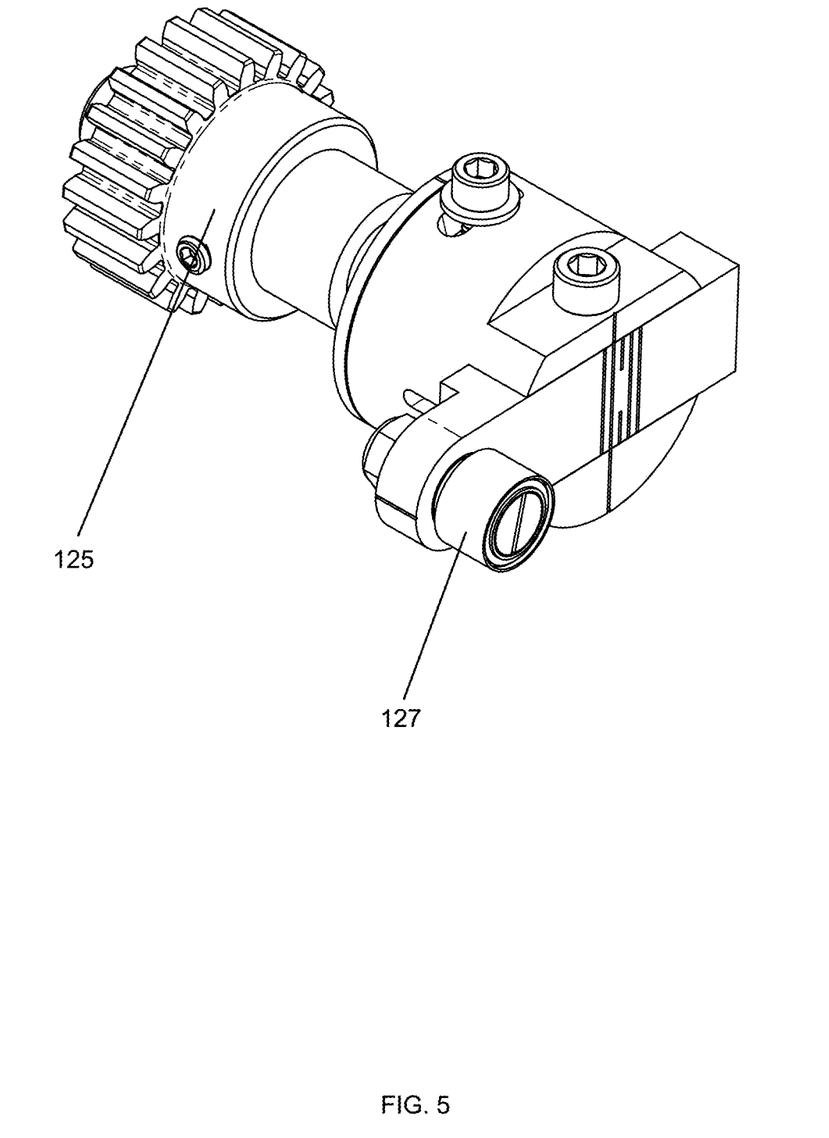
FIG. 5 is a perspective view of a spur gear assembly of the magnet motor of FIGS. 1A-1B.

The side members include slots 123 sized to receive the main shaft 101. In operation, the main shaft 101 rotates within slot 123 as the piston moves back and forth such that the main shaft 101 does not interfere with movement of the piston 120. The piston 120 further includes a slotted spur mount 124. The spur 127 of the spur gear 125 (see FIG. 5) rides within the vertical slot 124. As the spur gear 125 rotates, the spur 127 in the slot of the slotted mount 124 travels in a circular path causing the slotted spur mount 124 to travel horizontally in a reciprocal motion, which drives the piston 120 laterally along its longitudinal axis. The foregoing movement of piston 120 brings each of the two magnets 122 mounted on piston 120 alternately near and away from a recess 112.

Returning to FIGS. 1A-1B, the two rotating members 110A, 110B are spaced apart along the main axis 101. Both rotating members 110A, 110B are rigidly attached to the main axis 101 such that they rotate together. The arms 111 of the second rotating member 110B are offset from the arms 111 of the first rotating member 110A in the circumferential direction. In one embodiment having two rotating members 110A and 110B, each having three arms 111, the arms 111 of rotating member 110A are offset 30 degrees from the arms 111 of rotating member 110B. Accordingly, when the first rotating member 110A is positioned such than an arm 111 is pointed directly at a magnet 122, every arm 111 of the second rotating member 110B is oblique to the piston 120B. Further, when a first piston 122 associated with first rotating member 110A is positioned with each of its magnets 122 equidistant from main axis 101, the second piston 120 associated with the second rotating member 110B is positioned such that its magnets 122 are not equidistant from main axis 101. As a result of the foregoing arrangement, at any angular position, the arms 111 of at least one of rotating members 110A and 110B is being pushed by magnetic force to rotate by a magnet 122 at or near the position where the force is the strongest (i.e., fully inserted into a recess 112).

In a preferred embodiment, the two rotating members 110A, 110B are offset such that instances of one of the four magnets 122 being centered within a cavity 112 are evenly spaced. In the three-arm embodiment shown, the two rotating members 110A, 110B are offset by 30 degrees.

Figure 6:
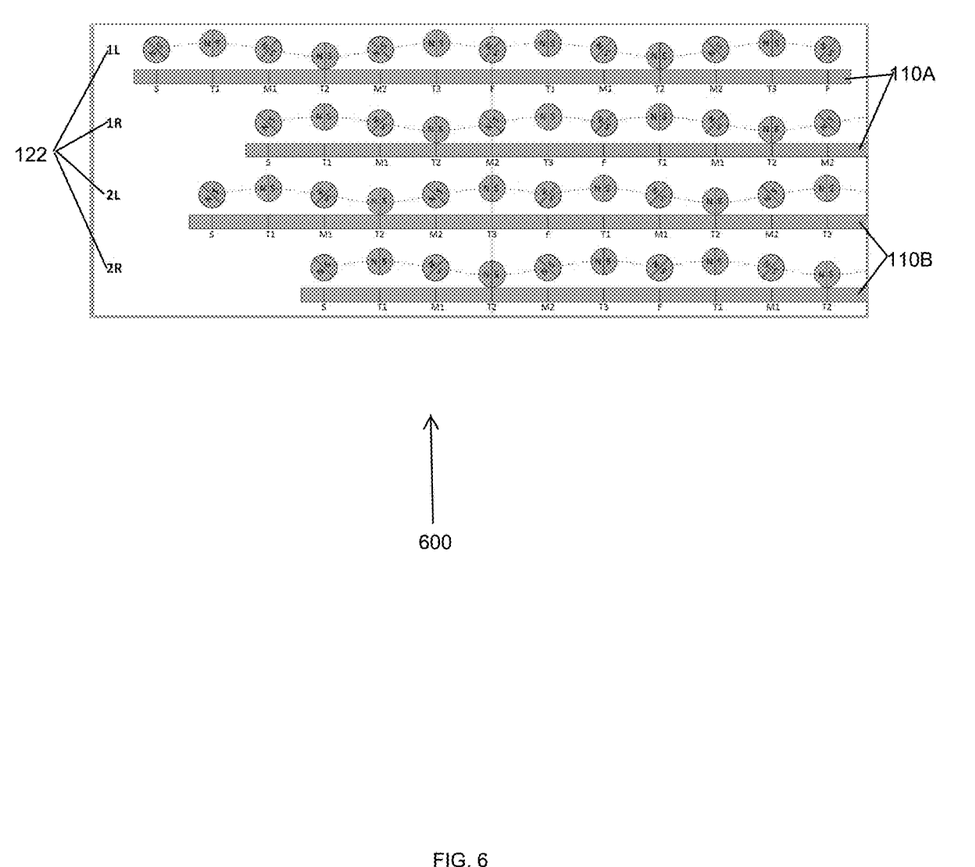
FIG. 6 is a chart illustrating the positive magnetic force exerted on a rotating member by the piston-mounted magnets at various locations relative to the rotating member.

FIG. 6 illustrates the net magnetic force between each of the four magnets 122 and the corresponding rotating member 110A, 110B. The chart 600 indicates the position (S, T1, M1, T2, M2, T3, F) of the magnets 122 around one arm 111 of a rotating member 110A. The positions are shown in FIG. 2. The magnets 122 marked 1L and 1R are the two magnets 122 mounted on the first piston 120A associated with rotating member 110. The two magnets marked 2L and 2R are the two magnets 122 mounted on the second piston 120B associated with rotating member 110B.

FIG. 6 assumes that all the magnets 114 and 122 have constant magnetic fields, such as permanent magnets. In some embodiments of the motor of the present invention, the piston magnets 122 or the arm magnets 114, or both, can be electromagnets. The amount of net positive force at the various positions will be different in embodiments in which magnets 114 or magnets 122 are electromagnets that produce variable magnetic fields.

As shown, each magnet 122 experiences a net positive force, i.e., a net force acting to rotate the rotating member 110 in the proper direction, at every location along its path. Even when a magnet 122 is at the point of an arm (location T2) it is acted upon by the magnetic fields of the other two arms 111. Specifically, it is repelled by the arm 111 counter-clockwise from the magnet 122 and attracted to the arm 111 clockwise (from the point of view of FIG. 2) so as to impart a force causing the rotating member 110 to continue rotating in the counter-clockwise direction.

In the three-arm embodiments shown, when a first magnet 1L is at the point of lowest positive force (T2), the other magnet 1R of the same piston is at the point of highest positive force (T1 or T3). Accordingly, the combined force of the magnets 1L and 1R on the rotating member 110 remains positive and relatively constant. Similarly, the high force points (T1, T3) of the second set of magnets 2L, 2R are offset such that they align with middle magnetic force points (M1, M2) of the first set of magnets 1L, 1R. This further serves to provide a relatively constant rotational force on the main shaft 101.

As discussed above, the motor 100 includes flywheels 103 mounted on the main shaft 101. The inertial of the flywheels 103 acts to smooth out the rotation of the main shaft 101 and causes a relatively constant rate of rotation during operation of the motor 100.

The motor 100 is an illustrative example. It is understood modifications could be made and the motor 100 would operate in substantially the same manner. For example, the number of arms 111 on each rotating member 110 can be increased. Additionally, more than two rotating members 110 mounted on the shaft 101 can be used.

In the embodiment shown, the magnets 122 have both poles exposed, i.e., facing outward from the piston 120, and the magnets 114 lining the arms have only the first pole 114A pointing outward from the arms 111. It is understood that in alternative embodiments, the magnets 122 can be replaced with a magnet assembly having only one pole 122A facing outward by forming the magnet assembly 122 from multiple magnets having their second poles 122B placed together facing inward. In such embodiments, each arm has opposite poles 114A and 114B facing outward in the two directions with the first pole 114A facing outward from the first side 118, and the second pole 114B facing outward from the second side 119. This results in the same net magnetic force as the magnets 122 are always being attracted to one arm and repelled by another.

Figure 7:
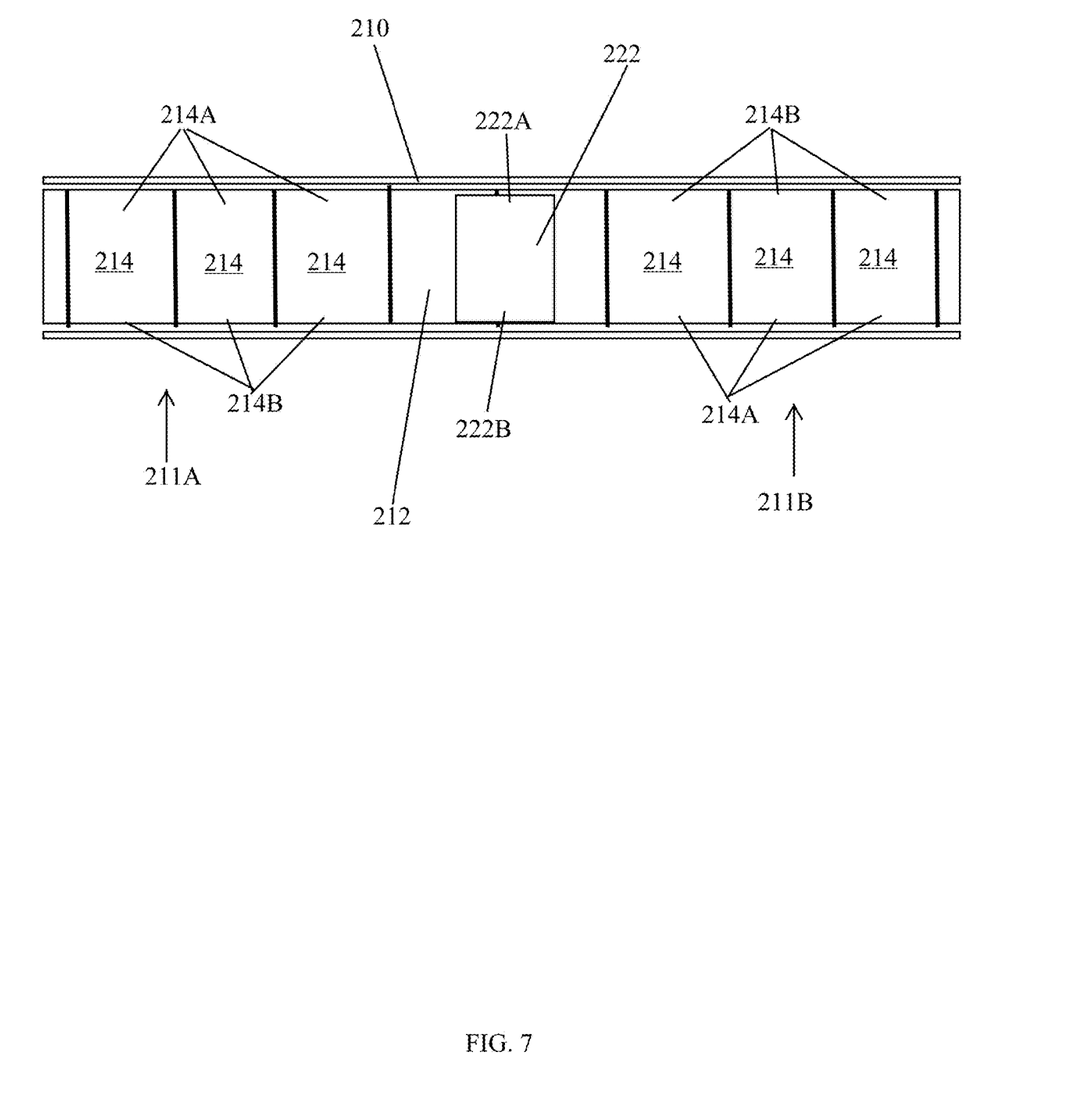
FIG. 7 is a schematic, end elevation view of a rotating member and piston-mounted magnet for use in a motor, such as the motor of FIGS. 1A-1B.

FIG. 7 illustrates an alternative embodiment of a rotating member 210 and piston-mounted magnet 222 for use in a magnet motor, such as the motor 100. The rotating member 210 has more than two arms 211, such as three arms as with the rotating members 110 above. Because FIG. 7 is an end view, only two arms 211A, 211B are visible. The arms 211A, 211B of the rotating member 210 are at least partially covered on surfaces parallel with the axis of rotation with magnets 214. The magnets 214A and 214B are oriented such that the poles of the magnets 214A and 214B point in opposite directions that are parallel to the axis of rotation.

Referring further to FIG. 7, the piston mounted magnets 222 are similarly oriented such that the poles of the magnet 222 point in directions generally parallel with the axis of rotation of the rotating member 210. The magnet 222 has a first pole 222A and a second pole 222B. Similarly, the magnets 214 have first poles 214A and second poles 214B. Adjacent surfaces of the arms 211A, 211B have the magnets 214 reversed relative to each other, meaning that from the point of view of a recess 212, the outward-facing surfaces of the two arms 211 have magnets 214 in opposite orientations. Similarly, for each arm 211, the two sides of the arm having magnets 214 in opposite orientation. Accordingly, each arm has magnets 214 in a first orientation on a first side (such as side 118 of the arms 111 above) and magnets 214 in a second orientation on a second side (such as side 119 of the arms 11 above). As a piston magnet 222 travels along one full path, it passes by six surfaces (the two sides of each of the three arms 211), which alternate between the two orientations. When the magnet 222 is in the recess 212 between the first and second arms 211A, 211B, the first poles 214A on the first arm 211A align with the first pole 222A of the magnet 222, and the first poles 214A on the second arm 211B align with second pole 222B of the magnet 222.

Accordingly, the magnets 214 of the first arm 211A are repelled by the magnet 222, and the magnets 214 of the second arm 211B are attracted to the magnet 222. This attraction and repulsion cause the rotating member to rotate.

The rotating member 210 and magnet 222 are used in place of the rotating members 110 and magnets 122 in a motor 100. The operation of the motor is unchanged from the description above. Alternating surfaces of the arms 211 of the rotating member 210 have the orientation of the magnets 214 reversed For example, the back side of the arm 211A (from the point of view of FIG. 7) has magnets oriented the same as the shown surface of the arm 211B.

This causes the rotating member 210 to continue to rotate as each arm passes the magnet 222.

The above described embodiments have magnets mounted on all three arms of the rotating members as well as on the pistons. In one embodiment, each of these magnets is a permanent magnet.

In alternative forms of the present invention, one or more of the magnets is replaced with electromagnets. For example, in one form each of the arm mounted magnets 114 is an electromagnet while the piston mounted magnets 122 are permanent magnets. The flow of electricity through the arm mounted magnets 114 may be constant or may be varied as the arms rotate in order to optimize the amount of net positive force. In one embodiment, each arm has a single electromagnet 114. As the electromagnet 114 passes by a piston mounted magnet 122, the flow of electricity is reversed causing the polarity of the electromagnet 114 to reverse. This causes the arm which was previously being attracted to the piston magnet 122 to then be repelled by the magnet 122.

In alternative forms, the arm mounted magnets 114 are permanent magnets and the piston mounted magnets 122 are electromagnets. The voltage or current applied to the piston mounted electromagnets 122 may be constant or may be varied as the piston moves reciprocally along its path. In one form, the voltage or current applied to electromagnet 122 is increased when the magnet is between two arms (e.g., positions T1 and T3) when the magnetic fields from the arm mounted magnets 114 acting upon the piston magnet 122 are strongest. The voltage or current is then reduced when the piston electromagnet 122 is farther from the center (e.g., position T2). By varying the voltage or current supplied to each of the piston mounted electromagnets 122 in this way, the efficiency of the motor can be increased.

The motor 100 described above can be used to operate a number of known devices. In one embodiment, the motor 100 is coupled to a generator to produce electricity.

In addition, the description of devices described herein are understood to enable one to carry out methods relating to the devices. For example, methods of using the device, methods of generating electricity, and methods of manufacturing such motors are all considered and disclosed herein.

What is claimed is:

1. A motor comprising:
   a main shaft;
   a first rotating member mounted on the main shaft, the first rotating member comprising:
      a first arm extending radially outward from the main shaft, the first arm having a length L;
      a second arm extending radially outward from the main shaft, the second arm being coplanar with the first arm in a plane perpendicular to an axis of the main shaft;
      a first magnet mounted on the first arm such that a first pole of the first magnet faces a recess between the first and second arms; and
      a second magnet mounted on the second arm such that a first pole of the second magnet faces the recess between the first and second arms;
   a piston movable relative to the main shaft along a radial line perpendicular to the axis of the main shaft and positioned proximate the first rotating member, the piston comprising:
      a first piston-mounted magnet mounted on the piston proximate a first side of the first rotating member, wherein at least a portion of the first piston-mounted magnet is coplanar with the first and second arms of the first rotating member, the first piston-mounted magnet being movable along the radial line between a first position in which it is less than L distance from the main shaft and a second position in which it is more than L distance from the main shaft; and
      a second piston-mounted magnet mounted on the piston proximate a second side of the first rotating member opposite the first side, wherein at least a portion of the second piston-mounted magnet is coplanar with the first and second arms of the first rotating member, the second piston-mounted magnet being movable along the radial line between a first position in which it is less than L distance from the main shaft and a second position in which it is more than L distance from the main shaft.

2. The motor of claim 1 further comprising:
   a second rotating member mounted on the main shaft, the second rotating member comprising:
      a first arm extending radially outward from the main shaft, the first arm having a length L;
      a second arm extending radially outward from the main shaft, the second arm being coplanar with the first arm in a plane perpendicular to the axis of the main shaft;
      a first magnet mounted on the first arm such that a first pole of the first magnet faces a recess between the first and second arms; and
      a second magnet mounted on the second arm such that a first pole of the second magnet faces the recess between the first and second arms;
   a second piston movable relative to the main shaft along a radial line perpendicular to the axis of the main shaft and positioned proximate the second rotating member, the second piston comprising:
      a first piston-mounted magnet mounted on the second piston proximate a first side of the second rotating member, wherein at least a portion of the first piston-mounted magnet is coplanar with the first and second arms of the second rotating member, the first piston-mounted magnet being movable along the radial line between a first position in which it is less than L distance from the main shaft and a second position in which it is more than L distance from the main shaft; and
      a second piston-mounted magnet mounted on the second piston proximate a second side of the second rotating member opposite the first side, wherein at least a portion of the second piston-mounted magnet is coplanar with the first and second arms of the second rotating member, the second piston-mounted magnet being movable along the radial line between a first position in which it is less than L distance from the main shaft and a second position in which it is more than L distance from the main shaft.

3. The motor of claim 2, wherein the first arm of the second rotating member is offset circumferentially from the first arm of the first rotating member by an amount less than 120 degrees.

4. The motor of claim 2, wherein the first arm of the second rotating member is offset circumferentially from the first arm of the first rotating member by approximately 30 degrees.

5. The motor of claim 1 further comprising a spur gear operably coupled to the main shaft and operably coupled to the piston such that rotation of the main shaft causes the first and second piston-mounted magnets to move along the radial line between the respective first and second positions.

6. The motor of claim 1, the first rotating member further comprising a third arm extending radially outward from the main shaft and coplanar with the first and second arms, wherein the three arms of the first rotating member are equally spaced around a circumference of the main shaft.

7. The motor of claim 1 further comprising a generator operably coupled to the main shaft.

8. The motor of claim 1 further comprising a support supporting the piston.

9. The motor of claim 8 wherein the support comprises at least one roller on which the piston rests.

10. The motor of claim 1 further comprising at least one flywheel coupled to the main shaft.

11. The motor of claim 1 wherein the first and second magnets are reversed, such that the first pole of the first magnet faces in the opposite direction as the first pole of the second magnet.

12. A method of generating electricity comprising:
providing a motor comprising:
   a main shaft;
   a first rotating member mounted on the main shaft, the first rotating member comprising:
      a first arm extending radially outward from the main shaft, the first arm having a length L;
      a second arm extending radially outward from the main shaft, the second arm being coplanar with the first arm in a plane perpendicular to an axis of the main shaft;
      a first magnet mounted on the first arm such that a first pole of the first magnet faces a recess between the first and second arms; and
      a second magnet mounted on the second arm such that a first pole of the second magnet faces the recess between the first and second arms;
   a piston movable relative to the main shaft along a radial line perpendicular to the axis of the main shaft and positioned proximate the first rotating member, the piston comprising:
      a first piston-mounted magnet mounted on the piston proximate a first side of the first rotating member, wherein at least a portion of the first piston-mounted magnet is coplanar with the first and second arms of the first rotating member, the first piston-mounted magnet being movable along the radial line between a first position in which it is less than L distance from the main shaft and a second position in which it is more than L distance from the main shaft; and
      a second piston-mounted magnet mounted on the piston proximate a second side of the first rotating member opposite the first side, wherein at least a portion of the second piston-mounted magnet is coplanar with the first and second arms of the first rotating member, the second piston-mounted magnet being movable along the radial line between a first position in which it is less than L distance from the main shaft and a second position in which it is more than L distance from the main shaft;
positioning the first piston-mounted magnet into its first position while in the recess between the coplanar first and second arms;
repelling the first arm with the first piston-mounted magnet and attracting the second arm with the first piston-mounted magnet, causing the first rotating member to rotate;
moving the first piston-mounted magnet from the first position to the second position as the rotating member rotates; and
moving the first piston-mounted magnet from the second position to the first position proximate an opposite side of the second arm as the first rotating member continues to rotate;
operating a generator with the main shaft as the rotating member rotates.

13. The method of claim 12 further comprising:
providing a second rotating member mounted on the main shaft, the second rotating member comprising:
   a first arm extending radially outward from the main shaft, the first arm having a length L;
   a second arm extending radially outward from the main shaft, the second arm being coplanar with the first arm in a plane perpendicular to the axis of the main shaft;
   a first magnet mounted on the first arm such that a first pole of the first magnet faces a recess between the first and second arms; and
   a second magnet mounted on the second arm such that a first pole of the second magnet faces the recess between the first and second arms;
providing a second piston movable relative to the main shaft along a radial line perpendicular to the axis of the main shaft and positioned proximate the second rotating member, the second piston comprising:
   a first piston-mounted magnet mounted on the second piston proximate a first side of the second rotating member, wherein at least a portion of the first piston-mounted magnet is coplanar with the first and second arms of the second rotating member, the first piston-mounted magnet being movable along the radial line between a first position in which it is less than L distance from the main shaft and a second position in which it is more than L distance from the main shaft; and
   a second piston-mounted magnet mounted on the second piston proximate a second side of the second rotating member opposite the first side, wherein at least a portion of the second piston-mounted magnet is coplanar with the first and second arms of the second rotating member, the second piston-mounted magnet being movable along the radial line between a first position in which it is less than L distance from the main shaft and a second position in which it is more than L distance from the main shaft;
positioning the first piston-mounted magnet of the second piston into its first position while in the recess between the coplanar first and second arms of the second rotating member;
repelling the first arm of the second rotating member with the first piston-mounted magnet of the second piston and attracting the second arm of the second rotating member with the first piston-mounted magnet of the second piston, causing the second rotating member to rotate;
moving the first piston-mounted magnet of the second piston from the first position to the second position as the second rotating member rotates; and
moving the first piston-mounted magnet of the second piston from the second position to the first position proximate an opposite side of the second arm of the second rotating member as the second rotating member continues to rotate.

14. A motor comprising:
a main shaft;
a first rotating member mounted on the main shaft, the first rotating member comprising:
  a first arm extending radially outward from the main shaft, the first arm having a length L;
  a second arm extending radially outward from the main shaft, the second arm being coplanar with the first arm in a plane perpendicular to an axis of the main shaft;
  a first magnet mounted on the first arm on a surface facing a recess between the first and second arms; and
  a second magnet mounted on the second arm on a surface facing the recess between the first and second arms;
a piston movable relative to the main shaft along a radial line perpendicular to the axis of the main shaft and positioned proximate the first rotating member, the piston comprising:
  a first piston-mounted magnet mounted on the piston proximate a first side of the first rotating member, wherein at least a portion of the first piston-mounted magnet is coplanar with the first and second arms of the first rotating member, the first piston-mounted magnet being movable along the radial line between a first position in which it is less than L distance from the main shaft and a second position in which it is more than L distance from the main shaft; and
  a second piston-mounted magnet mounted on the piston proximate a second side of the first rotating member opposite the first side, wherein at least a portion of the second piston-mounted magnet is coplanar with the first and second arms of the first rotating member, the second piston-mounted magnet being movable along the radial line between a first position in which it is less than L distance from the main shaft and a second position in which is more than L distance from the main shaft.

15. The motor of claim 14 further comprising:
a second rotating member mounted on the main shaft, the second rotating member comprising:
  a first arm extending radially outward from the main shaft, the first arm having a length L;
  a second arm extending radially outward from the main shaft, the second arm being coplanar with the first arm in a plane perpendicular to the axis of the main shaft;
  a first magnet mounted on the first arm on a surface facing a recess between the first and second arms; and
  a second magnet mounted on the second arm on a surface facing the recess between the first and second arms;
a second piston movable relative to the main shaft along a radial line perpendicular to the axis of the main shaft and positioned proximate the second rotating member, the second piston comprising:
  a first piston-mounted magnet mounted on the second piston proximate a first side of the second rotating member, wherein at least a portion of the first piston-mounted magnet is coplanar with the first and second arms of the second rotating member, the first piston-mounted magnet being movable along the radial line between a first position in which it is less than L distance from the main shaft and a second position in which it is more than L distance from the main shaft; and
  a second piston-mounted magnet mounted on the second piston proximate a second side of the second rotating member opposite the first side, wherein at least a portion of the second piston-mounted magnet is coplanar with the first and second arms of the second rotating member, the second piston-mounted magnet being movable along the radial line between a first position in which it is less than L distance from the main shaft and a second position in which it is more than L distance from the main shaft.

16. The motor of claim 14 wherein the first magnet of the first rotating member is oriented such that a first pole of the first magnet faces towards the recess between the first arm and the second arm.

17. The motor of claim 14 wherein the first magnet has a first pole facing a first direction parallel to the axis of the main shaft and a second pole facing a second, opposite direction parallel to the axis of the main shaft.

18. The motor of claim 17 wherein the second magnet has a first pole facing the second direction and a second pole facing the first direction.

19. The motor of claim 1, wherein the first and second arms have at least one aperture extending therethrough along an axis parallel to the axis of the main shaft.

20. The motor of claim 1, wherein the first and second arms are formed of a ferromagnetic material.

21. A motor comprising:
a main shaft;
a first rotating member assembly comprising:
  a first rotating member mounted on the main shaft, the first rotating member comprising:
    a first arm extending radially outward from the main shaft, the first arm having a length L;
    a second arm extending radially outward from the main shaft, the second arm being coplanar with the first arm in a plane perpendicular to an axis of the main shaft;
    a first magnet mounted on the first arm such that a first pole of the first magnet faces a recess between the first and second arms; and
    a second magnet mounted on the second arm such that a first pole of the second magnet faces the recess between the first and second arms;
  a first piston movable relative to the main shaft along a first radial line perpendicular to the axis of the main shaft, the first piston positioned proximate the first rotating member, the first piston comprising:
    a piston-mounted magnet mounted on the first piston, wherein at least a portion of the piston-mounted magnet is coplanar with the first and second arms of the first rotating member, the piston-mounted magnet being movable along the first radial line between a first position in which it is less than L distance from the main shaft and a second position in which it is more than L distance from the main shaft; and
a second rotating member assembly comprising:
  a second rotating member mounted on the main shaft and spaced from the first rotating member along the axis, the second rotating member comprising:
    a first arm extending radially outward from the main shaft, the first arm having a length L;

a second arm extending radially outward from the main shaft, the second arm being coplanar with the first arm in a plane perpendicular to the axis of the main shaft;

a first magnet mounted on the first arm such that a first pole of the first magnet faces a recess between the first and second arms; and a second magnet mounted on the second arm such that a first pole of the second magnet faces the recess between the first and second arms; and a second piston movable relative to the main shaft along a second radial line perpendicular to the axis of the main shaft, the second piston positioned proximate the second rotating member, the second piston comprising:

a piston-mounted magnet mounted on the second piston, wherein at least a portion of the piston-mounted magnet is coplanar with the first and second arms of the second rotating member, the piston-mounted magnet being movable along the second radial line between a first position in which it is less than L distance from the main shaft and a second position in which it is more than L distance from the main shaft.

* * * * *